(12) United States Patent
Kuehler et al.

(10) Patent No.: US 11,583,881 B2
(45) Date of Patent: Feb. 21, 2023

(54) AUTOMATED IRRIGATION MALFUNCTION DIAGNOSTIC SYSTEM

(71) Applicants: Dan Kuehler, San Diego, CA (US); Jose Doval, Escondido, CA (US); Kirt Winter, San Diego, CA (US)

(72) Inventors: Dan Kuehler, San Diego, CA (US); Jose Doval, Escondido, CA (US); Kirt Winter, San Diego, CA (US)

( * ) Notice: Subject to any disclaimer, the term of this patent is extended or adjusted under 35 U.S.C. 154(b) by 1007 days.

(21) Appl. No.: 16/360,719

(22) Filed: Mar. 21, 2019

(65) Prior Publication Data
US 2019/0291124 A1 Sep. 26, 2019

Related U.S. Application Data

(60) Provisional application No. 62/646,499, filed on Mar. 22, 2018.

(51) Int. Cl.
*B05B 12/00* (2018.01)
*G05B 23/02* (2006.01)
*A01G 25/16* (2006.01)

(52) U.S. Cl.
CPC ............ *B05B 12/006* (2013.01); *A01G 25/16* (2013.01); *G05B 23/0272* (2013.01)

(58) Field of Classification Search
CPC .................................................... A01G 25/16
USPC ........................................................ 702/185
See application file for complete search history.

(56) References Cited

U.S. PATENT DOCUMENTS

| 4,937,732 | A  | * | 6/1990  | Brundisini | ............. | A01G 25/16 239/69 |
| 5,040,409 | A  |   | 8/1991  | Kiewit | | |
| 9,052,222 | B2 |   | 6/2015  | Stevens et al. | | |
| 9,527,102 | B2 |   | 12/2016 | Hill et al. | | |
| 2010/0313958 | A1 | * | 12/2010 | Patel | ................... | G01F 15/0755 137/552 |
| 2014/0222223 | A1 | * | 8/2014  | Horton | ................. | G05D 7/0617 700/284 |
| 2015/0308627 | A1 | * | 10/2015 | Hoskins | .................... | E03B 7/00 702/45 |
| 2017/0138151 | A1 |   | 5/2017  | Reyes, III et al. | | |
| 2018/0141069 | A1 | * | 5/2018  | Lemkin | ................ | A01G 25/167 |
| 2020/0042021 | A1 | * | 2/2020  | Somani | ................. | G01F 15/066 |

* cited by examiner

*Primary Examiner* — Md Azad
(74) *Attorney, Agent, or Firm* — Patent Beach PC

(57) ABSTRACT

An automated system for identifying a watering zone malfunction includes a sensor and a controller. The watering zone includes a valve that couples an input conduit to an output conduit. The output conduit terminates at one or more water distributors. The sensor is for capturing mechanical perturbations of the watering zone. The controller is configured to: store a profile defining at least one profile parameter based upon a transient operation of the zone in an intact state, receive the signal from the sensor during a watering operation when the zone is in an unknown state, compute a operation parameter based upon the signal for at least one time window of receiving the signal, determining a malfunction exists, and determine whether to take further action based upon the comparison.

20 Claims, 13 Drawing Sheets

FIG. 5: CALIBRATION (INTACT ZONE)

FIG. 6: WATERING OPERATION (UNKNOWN STATE)

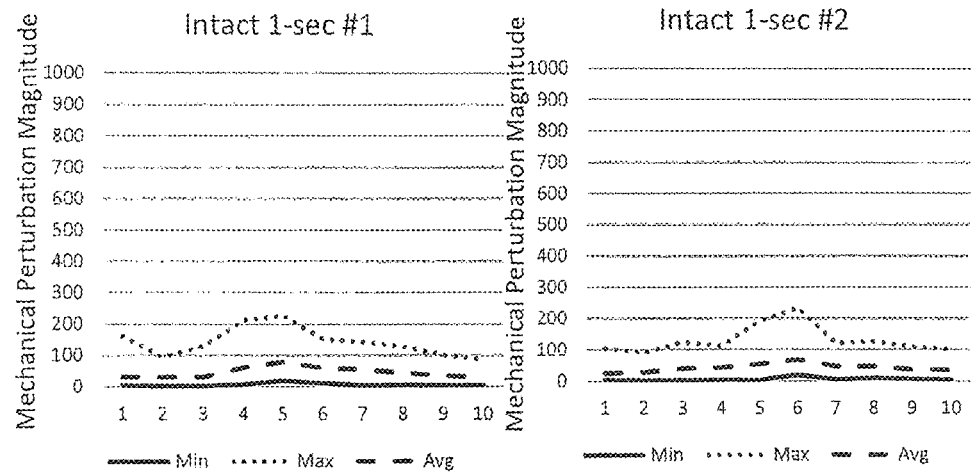
FIG. 10A
FIG. 10C
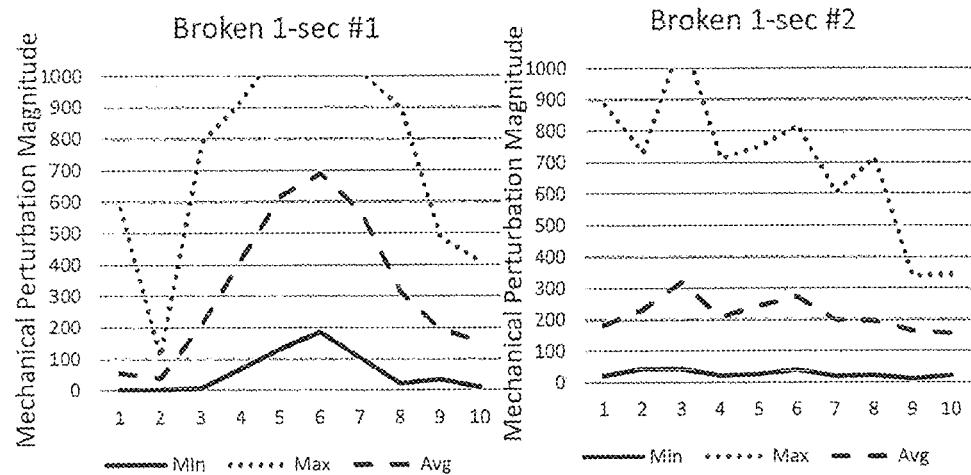
FIG. 10B
FIG. 10D ated water irrigation systems provide great convenience but suffer from occasional malfunction such as frozen valves, broken conduits, and electrical malfunction. There is a need to find an effective monitoring system that detects malfunctions but is also not cost prohibitive and can be quickly implemented for existing irrigation systems.

AUTOMATED IRRIGATION MALFUNCTION DIAGNOSTIC SYSTEM

PRIORITY CLAIM

This utility patent application contains subject matter claiming benefit of the priority date of U.S. Provisional Patent Application Ser. No. 62/646,499, filed on Mar. 22, 2018, accordingly, the entire contents of this provisional patent application is hereby expressly incorporated by reference.

FIELD OF THE INVENTION

The present disclosure relates to an apparatus and method for identifying and taking an action in response to a malfunction in a water irrigation system.

BACKGROUND

Automated water irrigation systems are commonly employed for hydrating plants on consumer, commercial, and government properties. Consumer properties include single family homes as well as shared landscaping (e.g., "common areas" such as small privately owned parks). Commercial properties include golf courses, agriculture, and commercial property landscaping. Government properties are similar to commercial properties and often include parks, landscaping, and sometimes plants grown as firebreaks.

Automated water irrigation systems provide great convenience but suffer from occasional malfunction such as frozen valves, broken conduits, and electrical malfunction. There is a need to find an effective monitoring system that detects malfunctions but is also not cost prohibitive and can be quickly implemented for existing irrigation systems.

BRIEF DESCRIPTION OF THE FIGURES

FIG. 7 illustrates four operational phases of a complete watering operation. The numbers on the horizontal axis represent tenths of a second. The horizontal axis represents about 130 seconds in total. The vertical axis is dimensionless and has a magnitude that is proportional to a magnitude of an amplitude of oscillation.

FIG. 10A is a plot of mechanical perturbation magnitude versus time for an intact watering system. Each point on each graph is either the minimum, maximum, or average for a 0.1 second interval. The numbers on the horizontal axis represent tenths of a second. The horizontal axis represents about 1.0 second total. The vertical axis is dimensionless and has a magnitude that is proportional to a magnitude of an amplitude of oscillation.

FIG. 10B is a plot of mechanical perturbation magnitude versus time for a broken watering system. Each point on each graph is either the minimum, maximum, or average for a 0.1 second interval. The numbers on the horizontal axis represent tenths of a second. The horizontal axis represents about 1.0 second total. The vertical axis is dimensionless and has a magnitude that is proportional to a magnitude of an amplitude of oscillation.

FIG. 10C is a plot of mechanical perturbation magnitude versus time for an intact watering system. Each point on each graph is either the minimum, maximum, or average for a 0.1 second interval. The numbers on the horizontal axis represent tenths of a second. The horizontal axis represents about 1.0 second total. The vertical axis is dimensionless and has a magnitude that is proportional to a magnitude of an amplitude of oscillation.

FIG. 10D is a plot of mechanical perturbation magnitude versus time for a broken watering system. Each point on each graph is either the minimum, maximum, or average for a 0.1 second interval. The numbers on the horizontal axis represent tenths of a second. The horizontal axis represents about 1.0 second total. The vertical axis is dimensionless and has a magnitude that is proportional to a magnitude of an amplitude of oscillation.

SUMMARY

Figure 1:
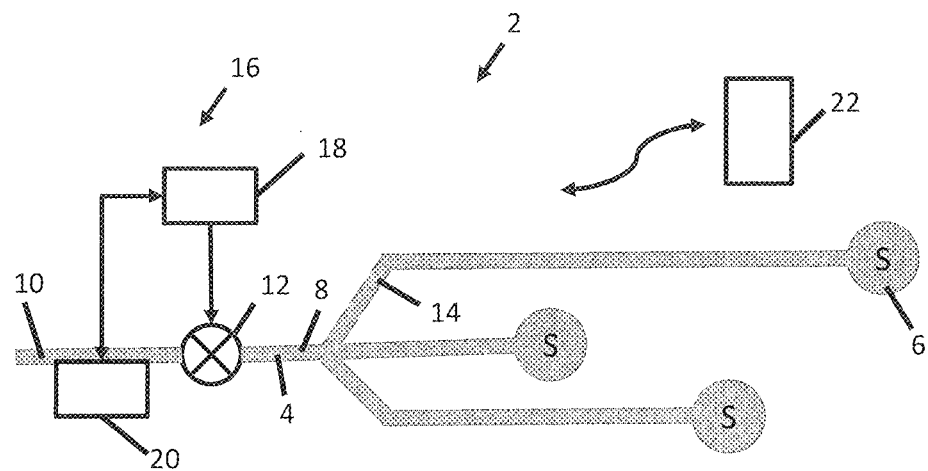
FIG. 1 is a schematic diagram of one zone of an embodiment of an automated watering system.

A first aspect of the disclosure is a system for identifying a watering zone malfunction. The watering zone includes a valve that couples an input conduit to an output conduit. The output conduit terminates at one or more water distributors. The system includes a sensor and a controller. The sensor is for capturing mechanical perturbations of the watering zone. The controller is configured to: store a profile defining at least one profile parameter based upon a transient operation of the (watering) zone in an intact state, receive the signal from the sensor during a watering operation when the zone is in an unknown state, compute a operation parameter based upon the signal for at least one time window of receiving the signal, compare the operation parameter to the profile parameter, and determine whether to take further action based upon the comparison. As a note, "an operation parameter" is a parameter computed during a watering operation when the zone is in an unknown state.

In one implementation the parameter (whether profile parameter or operation parameter) is indicative of an average magnitude of perturbations or oscillations during a time window of analysis. The parameter can have a magnitude that correlates with the average magnitude of perturbations or oscillations during the time window of analysis. The comparison of the parameters can include computing a difference between the operation parameter and the profile parameter. If the difference is above a predetermined threshold, then a decision is made to take further action.

In another implementation the parameter (whether profile parameter or operation parameter) is based upon a width of a peak of perturbation versus time. The comparison of the parameters can include computing a difference between the operation parameter and the profile parameter. The difference can be in units of time. If the difference has a magnitude larger than a certain threshold, then a decision is made to take further action.

In yet another implementation the time window includes a plurality of different time windows. The plurality of different time windows includes two or more of an incipient time window, an air purging time window, and a terminal time window. The profile parameter includes a different profile parameter for each of the time windows. Likewise, the operation parameter includes a different operation parameter for each of the time windows. The controller is configured to form separate comparisons between profile and operation parameters for each of the different time windows.

In a further implementation the time window includes an incipient time window within an incipient phase of operation. The incipient phase includes large magnitude perturbations or oscillations during initial fluid flow of the watering operation just after the valve is opened. The large magnitude perturbations are the largest magnitude oscillations that occur before the terminal phase. For some watering systems the incipient phase occurs within the first ten seconds of operation after the valve is opened.

In a yet further implementation the time window includes an air purging time window within an air purging phase. The air purging phase is temporally between an incipient (startup) phase and a steady state phase. The air purging phase can begin between one and ten seconds after the valve is opened and lasts until air in the zone is purged.

In another implementation the time window includes a terminal time window within a terminal phase. The terminal phase starts when the valve is being closed and includes a transient peak that occurs due to valve closure.

In yet another implementation a decision to take further action includes an additional operation. The additional operation can include sending an alert to a user's client device indicative of a diagnosed malfunction. The additional operation can include shutting down operation of the zone until the cause of the malfunction is mitigated.

A second aspect of the disclosure is a system for identifying a watering zone malfunction. The watering zone includes a valve that couples an input conduit to an output conduit. The output conduit terminates at one or more water distributors. The system includes a sensor and a controller. The sensor is configured to output a signal based upon mechanical perturbations of the watering zone. The controller is configured to perform a calibration operation during an intact state and to perform a watering operation during an unknown state. The calibration operation includes operating the valve to allow fluid flow for a time duration during the calibration, receiving the sensor signal during one or more transient phases of the zone during the calibration, analyzing the sensor signal from the calibration to define a profile parameter, and store the profile parameter. The watering operation includes operating the valve to allow fluid flow to occur during a time duration during the watering operation, receiving the sensor signal during one or more transient phases of the zone during the watering operation, analyzing the sensor signal from the watering operation to define at least one operation parameter, comparing the operation parameter to the profile parameter, and determining whether a malfunction is occurring based upon the comparison.

In one implementation the sensor is located on or proximate to the valve. The sensor can include one or more of an accelerometer, a microphone, a subsonic sensor and a pressure sensor. The sensor can be integrated into the valve. The sensor can sense a position of a diaphragm within the valve. Position sensing can be based on sensing an electric field, a capacitance, an inductance, a complex impedance or acoustic waves. For some implementations the diaphragm can be modified to enhance a signal indicative of position. For some implementations the sensor can include a pair of electrical contacts and include sensing of a real or complex impedance between them. The electrical contacts can be directly disposed upon portions of the valve to determine whether it is open or closed.

In another implementation the sensor signal is based on a time window that contains at least a portion of one of the transient phases of operation. The time window can include just one time window or a plurality of different time windows. The profile parameter can include a plurality of different profile parameters that correspond to the plurality of different time windows.

In yet another implementation the profile parameter has a magnitude that correlates with the area under a curve of perturbation amplitude versus time during the calibration and the operation parameter has a magnitude that correlates with the area under a curve of perturbation amplitude versus time during the watering operation. The determination to take further action is based upon a difference between the operation parameter and the profile parameter. When the difference exceeds a threshold, a malfunction is indicated and further action is taken. The further action can include one or more of transmitting an alert to a client device and suspending operation of the watering zone.

DETAILED DESCRIPTION OF THE PREFERRED EMBODIMENTS

FIG. 1 is a schematic diagram of one zone of an embodiment of an automated watering system 2 that detects malfunctions such as leaks. The watering system 2 includes a conduit structure 4 and at least one water distributor 6 that define a watering fluid path 8. The watering fluid path 8 extends through an input conduit 10, a valve 12, a branching output conduit 14 and the water distributors 6. The water distributor(s) 6 can include one or more of a "pop-up" sprinkler head, a "drip system" hose, and a reciprocating sprinkler, to name some examples. The valve 12 is an electromechanical valve (e.g., a solenoid-activated valve) that is responsive to an electrical signal.

Intact and broken zones: According to this disclosure, an "intact" zone is one that has no malfunction. A "broken" zone has one or more physical or electrical defects that cause a malfunction. A malfunction in a zone of watering system 2 can include a leak in the conduit structure 4 and/or the water distributors 6. A leak can be due to a large crack or unwanted opening in a conduit or a water distributor 6. A leak can also be due to a missing water distributor 6 or an unintended disconnection between components defining the fluid path 8. Other malfunctions can include valves that don't open, a valve that doesn't close, and/or a solenoid that does not operate.

The watering system 2 also includes an electronic system 16 for controlling valve 12 and detecting and responding to malfunctions. Electronic system 16 includes main control module 18 electrically or wirelessly coupled to one or more sensor modules 20. The main control module 18 operates one or more valves 12 and receives information from the sensor module(s) 20 indicative of malfunctions of the watering system 2. Typically, the main control module 18 will control watering operations and malfunction sensing for a plurality of zones.

A client device 22 is wirelessly or electrically coupled to the electronic system 16. The client device 22 allows a user control and monitor operation of the watering system 2 and to receive alerts concerning malfunctions. The client device 22 can be one or more of a desktop computer, a mobile computer, a smart phone, a laptop computer, a tablet computer, or a personal digital assistant, to name a few examples. Alternatively, the client device 22 can be integrated with the main control module 18. Client device 22 can represent a user interface that is integrated with main control module 18. In yet other embodiments client device 22 can include any combination of the above.

Figure 2:
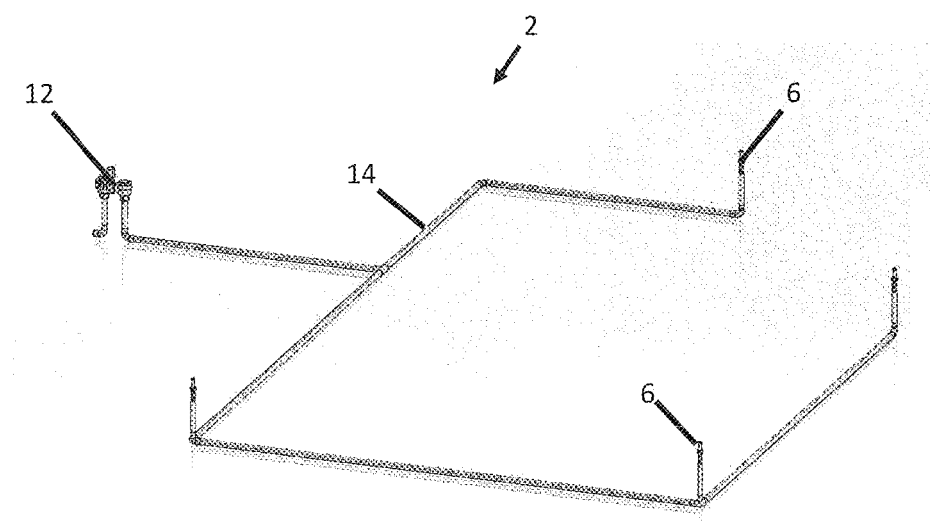
FIG. 2 is an isometric drawing of a fluid handling system of an embodiment of a single zone of a watering system.

FIG. 2 is an isometric drawing of an embodiment of a fluid handling portion of a single zone of watering system 2. This depicts a valve 12 connected to four sprinkler heads 6 via the branching conduit 14. In an exemplary embodiment, the sensor module 20 is placed on or proximate to the valve 12. In some embodiments, the sensor module is integrated with the valve 12.

Figure 3:
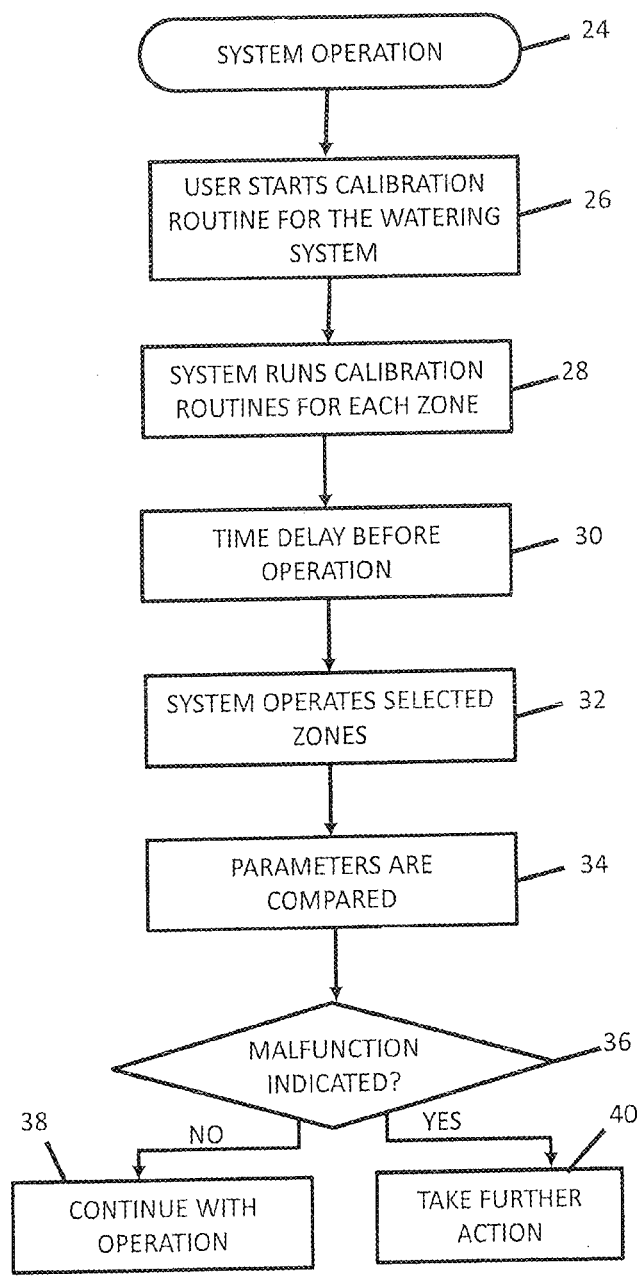
FIG. 3 is a flowchart of an embodiment of a method of calibrating and operating a watering system from a user perspective.

FIG. 3 is a flowchart of an embodiment of a system operation method 24 of operating the watering system 2 from a user perspective. The user operates watering system 2 with a client device 22. Method 24 is therefore performed with the client device 22 and the electronic system 16. Before step 26, it is assumed that the user has used the client device 22 to input a watering sequence for all zones being activated by the main control module 18.

According to step 26, the user starts a calibration operation or routine. When the user starts step 26, it is done from a perspective of knowing that all zones in the system 2 are defect-free. The user may choose to observe the calibration routine to verify that there are no malfunctions. According to step 28, the system 2 calibrates each zone specified by the user. This results in a stored calibration profile for each watering zone. Each stored calibration profile includes at least one calibration profile parameter. At this point, the system is ready for operation.

Step 30 indicates a time delay before a watering operation that is based upon the watering sequence specified by the user. According to step 32, the watering system 2 operates the zones and captures mechanical perturbation (e.g. oscillatory, vibrational, sound, and/or pressure indicative) information generated by sensor module 20. Based upon the information collected during step 32, an operation parameter is defined. According to step 34, the operation parameter is compared against the calibration profile parameter for each zone. According to step 36, a determination is made as to whether the comparison is indicative of a malfunction. If no malfunction is indicated, then the watering process continues according to the programmed watering sequence.

If, on the other hand, a malfunction is indicated then the system takes further action according to step 40. Further action can include one or more immediate steps. Further action can include sending an alert to the user client device 22. The alert can take the form of a text message, a recorded message, an email, and/or the update of a status web page. Further action can also include suspending operation of the malfunctioning zone(s).

Figure 4:
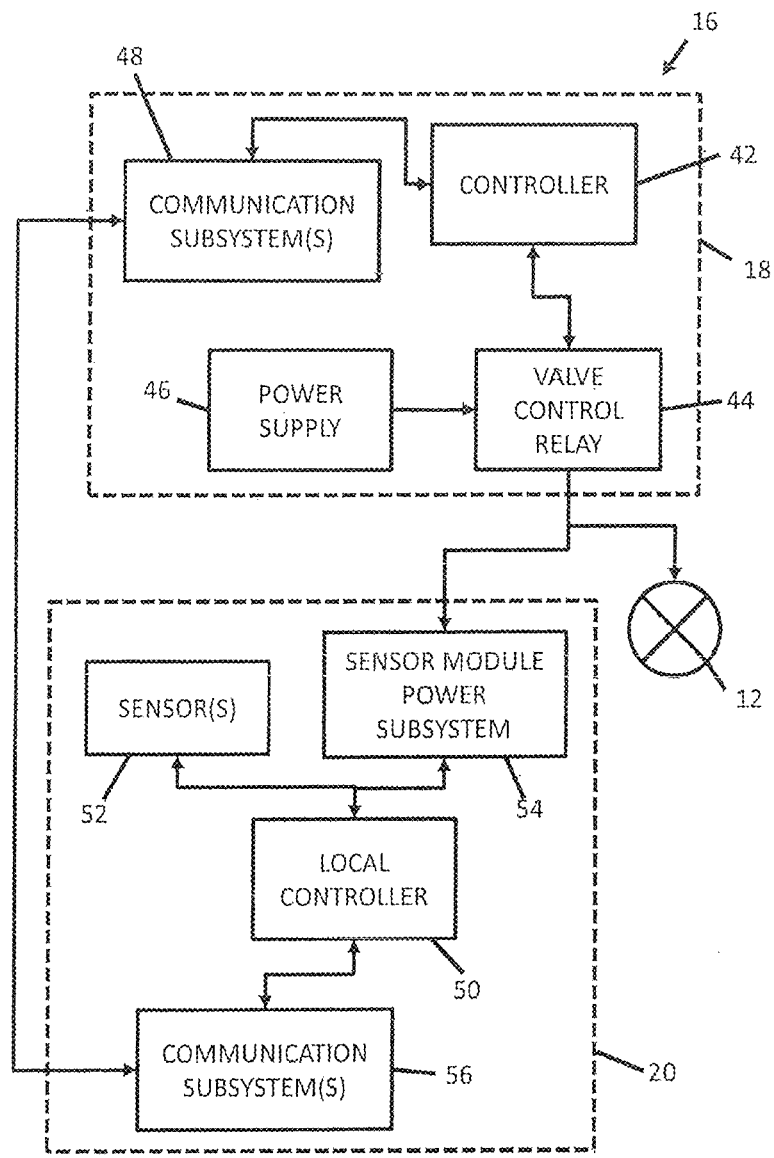
FIG. 4 is an electrical block diagram of an embodiment of an electronic system which includes a main control module and a sensor module.

FIG. 4 is an electrical block diagram of an embodiment of the electronic system 16 which includes main control module 18 and sensor module 20. The depicted main control module 18 includes a controller 42 that controls a valve control relay 44. The valve control relay 44 receives power from power supply 46 and actuates the valve 12. This diagram is simplified but it is to be understood that element 44 can represent multiple relays 44 for controlling multiple valves 12 (for example, one valve per zone). Not shown is a user interface and/or wireless link to the controller 42 to allow programming of the relays 44 according to a desired operation or sprinkler sequence.

In some embodiments, the controller 42 communicates with the client device 22 using communication subsystem 48. Alternatively the client device 22 is a user interface forming part of the main control module 18. Programming the watering zones and calibration routines are performed using the client device 22 as discussed supra.

The sensor module 20 includes a local controller 50 coupled to a sensor 52, a sensor module power subsystem 54, and a communication subsystem 56. The local controller 50 receives information or signals from sensor 52. The local controller 50 sends information to controller 42 concerning sensor signals through the link of communication subsystem 56 and communication subsystem 48. The sensor module power subsystem 54 can receive power from one or more alternative sources such as from the valve control relay 44, the power supply 46, from another external power source, or an internal power storage device such as a battery. The sensor module power subsystem 54 provides power to sensor 52, local controller 50, and communication subsystem(s) 56.

The controllers 42 and 50 can each include a processor coupled to an information storage device. The information storage device includes non-transient or non-volatile memory storing instructions, that when executed by the processor, control portions of the electronic system 16. In some embodiments, the controllers 42 and 50 are integrated as one device located within the main control module 18.

Figure 5:
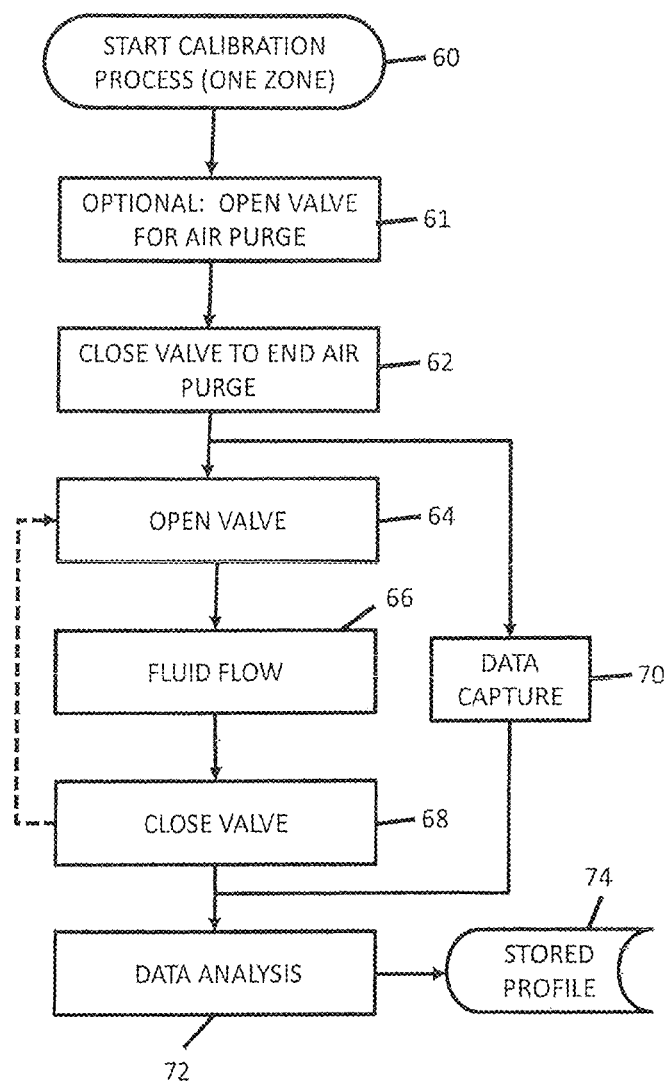
FIG. 5 is a flowchart depicting an embodiment of a calibration process for a watering system.

FIG. 5 is a flowchart depicting an embodiment of a calibration process 60. Calibration process 60 is similar to steps 26 and 28 described with respect to FIG. 3. The calibration process 60 is performed on functional zones in an intact state (without fluidic breaks or other malfunctions). The calibration process has two parallel paths including a fluidic operation path (steps 64-68) and a data capture path 70.

Steps 61 and 62 are performed to purge air from the fluid path 8. This step is performed so that the state of the fluid path 8 is consistent between calibration and later operation so that data can be properly compared. In step 61, the valve 12 opened to purge air that may accumulate in the system due to a state of non-operation. Valve 12 is then closed in step 62.

According to step 64, the valve is then opened. Step 66 represents the time duration of fluid flow through the fluid path 8. According to step 68, the valve is closed.

Data capture 70 occurs concurrently with at least a portion of the time duration of steps 64-68. In some embodiments, data capture occurs during one big time window that starts about when a signal is sent to relay 44 to open valve 12 (according to step 64) and then ends sometime after a signal is sent to the relay 44 to close valve 12 (according to step 68). In other embodiments, the data capture 70 may occur during multiple time windows that focus on particular operational time intervals that will be discussed with respect to FIG. 7. This latter approach has an advantage that it minimizes an amount of data to be captured.

According to step 72, the captured data is analyzed to define a stored calibration profile 74. A stored profile 74 includes one or more profile parameters that characterize a zone without any malfunctions. This profile can include one or more profile parameters that characterize transient operation of the watering system 2. The profile can also include additional parameters that characterize a steady state operation of the watering system 2.

As indicated by the dashed arrow from 68 to 64, the parallel process of operating the valve 12 (steps 64 to 68) and capturing data 70 can be repeated a number of times in order to provide a statistically accurate profile. The data analysis 72 can then include the averaging of data for a plurality of such cycles.

Figure 6:
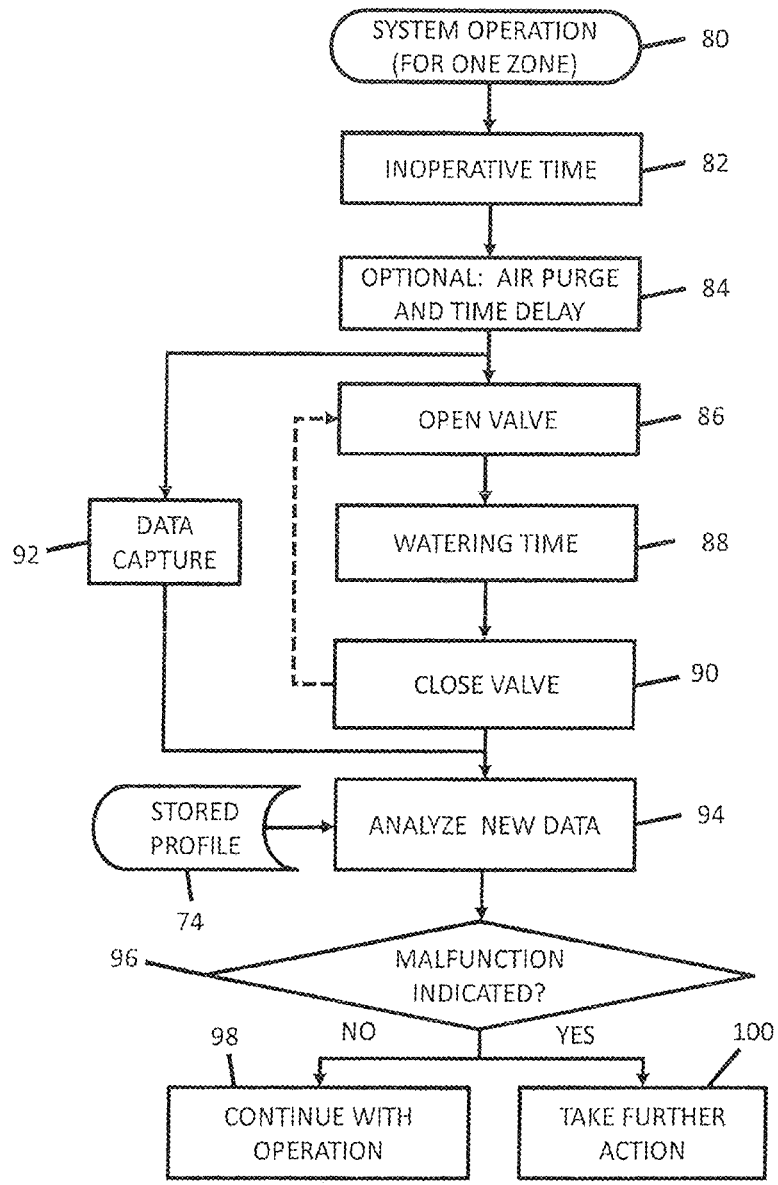
FIG. 6 is a flowchart depicting an embodiment of a watering operation for a watering system.

FIG. 6 is a flowchart depicting an embodiment of a watering operation 80 for a zone. Watering operation 80 occurs when the zone is an unknown state (not known whether the zone is intact or broken). According to step 82 the watering system 2 is programmed but inoperative. According to step 84, an optional air purge is performed. This is similar to the air purge steps 61 and 62 of calibration method 60. Also, the time between steps 84 and 86 should be the same as the time between steps 62 and 64 so that the fluid path 8 is similarly purged and primed between the calibration operation 60 and the watering operation 80.

Like the calibration operation 60, the watering operation 80 has two parallel paths including the fluidic steps 86-90 and data capture 92. In step 86, the valve 12 is opened. Step 88 represents a watering time during which the valve 12 is open. Step 90 represents closure of the valve 12.

Data capture 92 occurs concurrently with at least a portion of a time duration between steps 84 and 94. The data capture 92 occurs during one or more time windows that preferably correspond to the one or more time windows of data capture 70 so that comparable data is collected relative to a watering cycle.

According to step 94, the data captured in step 92 is analyzed. This includes the determination of at least one operation parameter based upon the data captured in step 92. The analysis also includes comparing operation parameter (s) to the stored profile parameter(s) 74. Based on this comparison, a determination is made as to whether a malfunction has taken place according to step 96. If no malfunction is identified, operation continues according to step 98. If a malfunction is identified, then further action is taken according to step 100. Step 100 is similar to step 40 of method 24 in FIG. 3.

As with calibration, the parallel process of operating the valve (steps 86-90) and capturing data 92 can be repeated for a number of cycles as indicated by the dashed arrow. This will provide a more statistically accurate comparison in the data analysis step 94.

Figure 7:
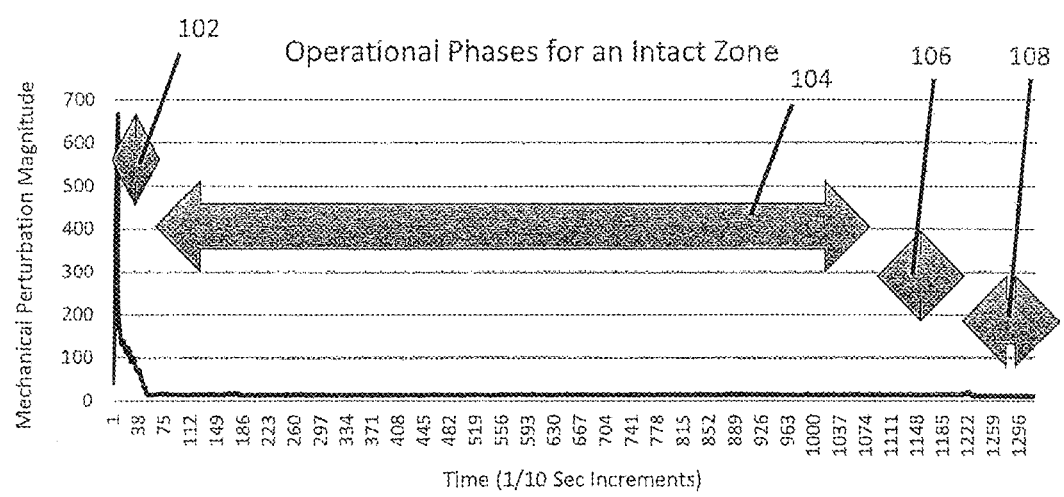
FIG. 7 is a plot of mechanical perturbation magnitude versus time for an intact zone.

FIG. 7 is a plot of mechanical perturbation magnitude versus time for an intact watering system. This plot is based upon a signal received from sensor 52. The time axis is in units of $1/10^{th}$ of a second and the total time of the horizontal axis is about 130 seconds. FIG. 7 illustrates four operational phases that are defined in terms of time intervals and include an incipient phase 102, an air purging phase 104, a steady-state phase 106, and a terminal phase 108. The phases 102, 104, and 108 can be referred to as transient phases opposed to the steady state phase 106.

Incipient phase 102 begins when the valve control relay 44 is closed which has the effect of opening valve 12. Incipient phase 102 ends at an "inflection point" at which the perturbation of opening the valve and initial rush of water through the valve are complete. Usually the incipient phase is complete within 10 seconds of actuating valve 12. For most systems the incipient phase is complete within a time range of 10 seconds or less. During the incipient phase 102, the perturbations have a peak magnitude and then eventually reach a minimum just before rising again at the start of the air purging phase 104. The minimum is identified as the inflection point that separates the two phases.

Air purging phase 104 begins at the inflection point and ends at the steady state phase 106. During the air purging phase 104, an energy of vibrations detected by the sensor 52 include exhaustion of air from the fluid path 8. The air purging phase can last over 100 seconds for some systems but can also vary depending on input fluid pressure and the geometry of the fluid path 8. In general, given the same percentage of air in the fluid path, it is the length of the path that determines the length of the air purging phase although other factors such as the water distributors 6 are a factor. Purging air bubbles and pockets generates perturbations that decrease at the end of the air purging phase 104.

Steady-state phase 106 will occur if the duration of watering time 88 is long enough to exhaust essentially all air from the fluid path 8. Then the energy of air purging no longer contributes to the perturbations. That will depend on programming of the watering system 2.

Terminal phase 108 starts when the valve 12 is closed. Terminal phase 108 can include residual vibrations as the flow of water through the fluid path 8 ceases. In broken systems, significant vibrations can be caused by the closing of the valve itself. In systems that have them, the anti-siphon valve can also add vibrations during this period. The terminal phase 108 is generally complete within about 10 seconds.

FIG. 7 depicts an elapsed time of 130 seconds to help illustrate the transient phases 102, 104, and 108. The time of 130 seconds was chosen for illustrative purposes. In typical watering systems 2, the operational phases 102-108 will tend to span a longer time range. A typical time range for phases 102-108 will be in a range of 5 to 15 minutes although other time ranges are sometimes used.

Some methods of how the profile is determined and used to identify a malfunctioning zone will be discussed infra. The order of these methods will be roughly in temporal order of when they can be used. Before each method is discussed, graphs depicting signals from the sensor 52 will be described. Each of the graphs represent information derived from a three-axis accelerometer. The magnitude of the illustrated waveform is approximately proportional to a square root of the sum of the squares of the signal from the three axes. But the actual method of computation can vary. What this signal represents or correlates with is a processed amplitude of oscillation. The square of the amplitude would correlate with a power level of oscillatory perturbations received by the sensor 52.

Figure 8A:
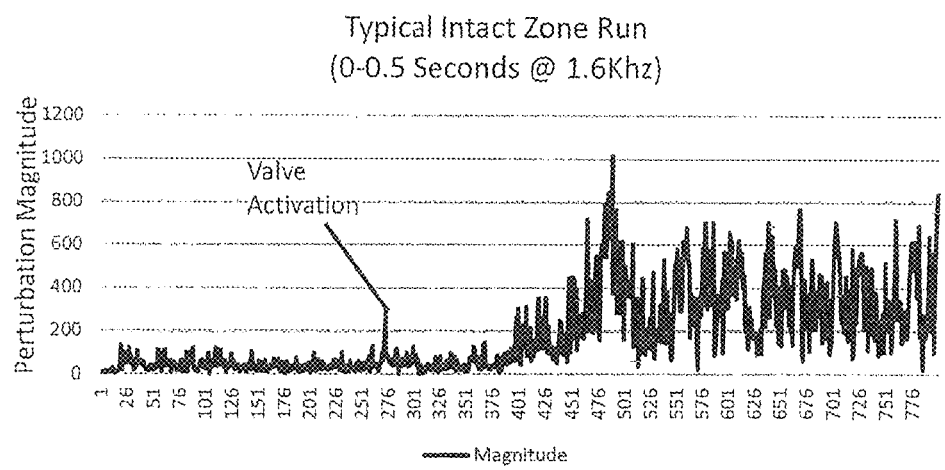
FIG. 8A is a plot of mechanical perturbation magnitude versus time for an intact watering system zone. The numbers on the horizontal axis represent units of $1/1600^{th}$ of a second and the total time of the horizontal axis is about 0.5 second. The vertical axis is dimensionless and has a magnitude that is proportional to a magnitude of an amplitude of oscillation.
Figure 8B:
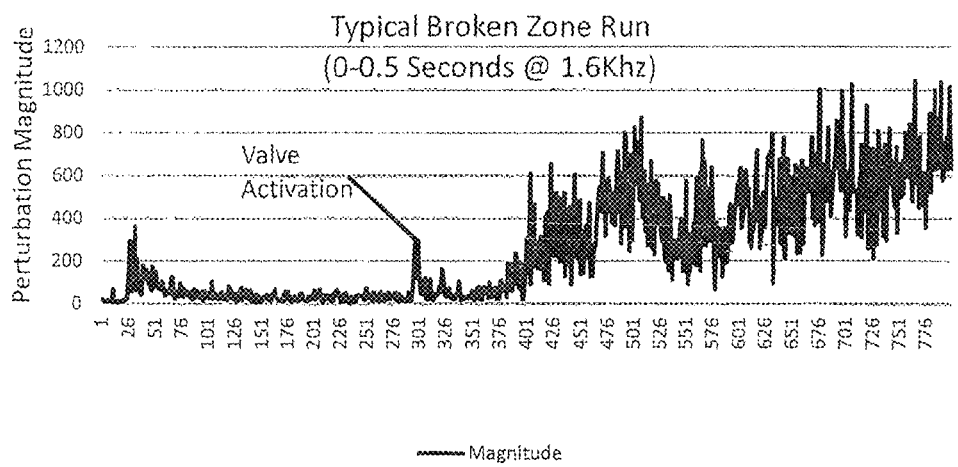
FIG. 8B is a plot of mechanical perturbation magnitude versus time for a broken watering system zone. The numbers on the horizontal axis represent units of $1/1600^{th}$ of a second and the total time of the horizontal axis is about 0.5 second. The vertical axis is dimensionless and has a magnitude that is proportional to a magnitude of an amplitude of oscillation.

FIG. 8A is a plot of mechanical perturbation magnitude versus time (from sensor 52) for an intact watering system zone. The time axis is in units of $1/1600^{th}$ of a second and the total time of the horizontal axis is about 0.5 second. FIG. 8B is the same as FIG. 8A except for a broken zone.

Method One—Time Between Solenoid Activation and Full Opening of Valve: An initial peak (see FIGS. 8A and 8B) is indicative of the valve activation. The peak width indicates how long it takes for a valve diaphragm to completely open, which occurs in response to a pressure balance upstream and downstream of the valve. This peak width is wider for a broken system because there is less downstream pressure (and hence opening force) on the diaphragm. Because of the lower downstream pressure, it takes longer for the upstream and downstream forces to equilibrate. Thus, in one embodiment, a profile parameter is indicative of a peak width for the valve activation. During the watering operation, the operational peak width is calculated and compared to the calibration peak width. If the operational peak width is wider beyond a certain threshold, then a malfunction is detected. An advantage of this method is that a malfunction can be detected very quickly—within half of a second.

Figure 9A:
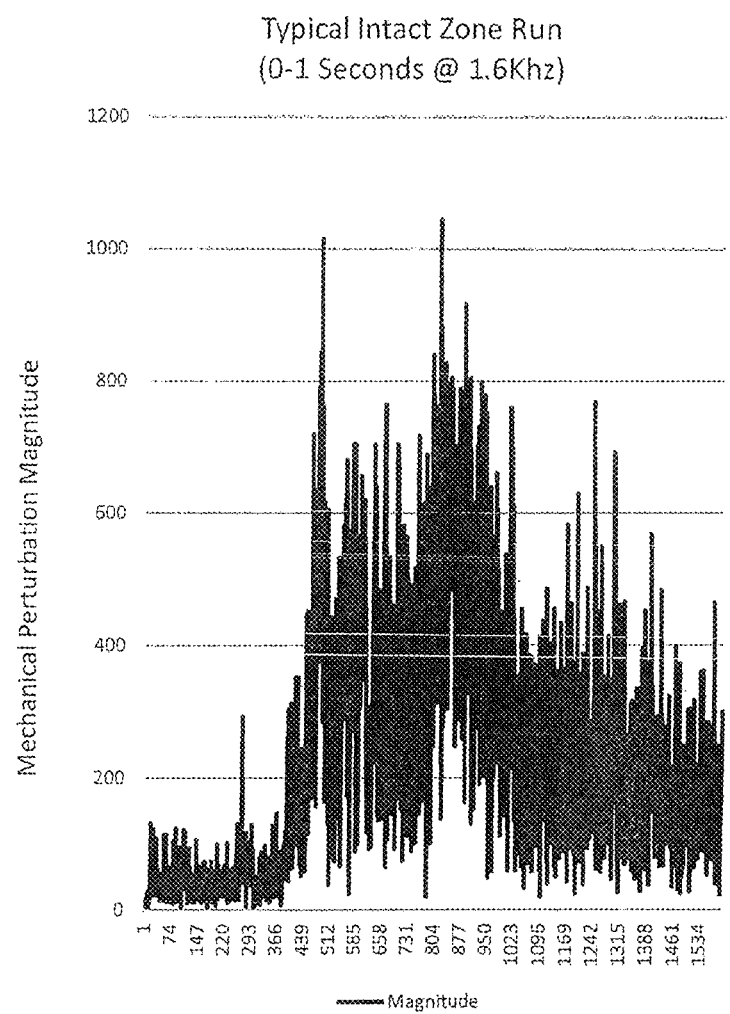
FIG. 9A is a plot of mechanical perturbation magnitude versus time for an intact watering system zone. The numbers on the horizontal axis represent units of $1/1600^{th}$ of a second and the total time of the horizontal axis is about 1.0 second. The vertical axis is dimensionless and has a magnitude that is proportional to a magnitude of an amplitude of oscillation.
Figure 9B:
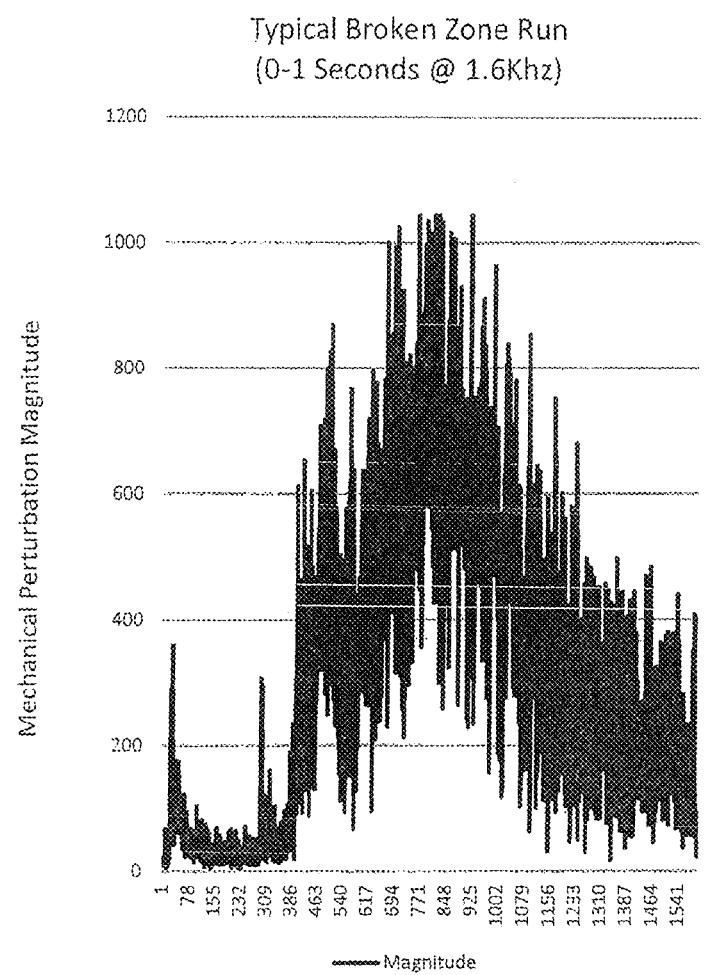
FIG. 9B is a plot of mechanical perturbation magnitude versus time for a broken watering system zone. The numbers on the horizontal axis represent units of $1/1600^{th}$ of a second and the total time of the horizontal axis is about 1.0 second. The vertical axis is dimensionless and has a magnitude that is proportional to a magnitude of an amplitude of oscillation.

FIG. 9A is a plot of mechanical perturbation magnitude versus time for an intact watering system zone. The time axis is in units of $1/1600^{th}$ of a second and the total time of the horizontal axis is about 1.0 second. FIG. 9B is the same as FIG. 9A except for a broken zone.

Method Two—Initial Magnitude Summation of Incipient Perturbations: The data capture 70 step of FIG. 5 can include capturing some or all of the perturbation data illustrated in FIG. 9A. From this data one or more profile parameters can be computed and stored. A time window for data analysis 72 includes some or all of the time axis of FIG. 9A. Based on this time window, a profile parameter is a measure of the area under the oscillating curve.

The data capture 92 step of FIG. 6 can include capturing some or all of the perturbation data illustrated in FIG. 9B. Preferably, the time window for data analysis 94 will be equivalent to the time window for data analysis 72 so that the data is comparable. From this time window, an operation parameter can be a measure of the area under the oscillating curve. The operation parameter is compared to the profile parameter to determine whether a sprinkler zone is broken according to steps 94 and 96 of FIG. 6. For a broken sprinkler zone, the operation parameter will be larger than some threshold relative to the profile parameter.

FIGS. 10A-10D are each plots of mechanical perturbation magnitude versus time. The vertical axis is dimensionless and has a magnitude that is proportional to a magnitude of an amplitude of oscillation. Each point on each graph is either the minimum, maximum, or average for an 0.1 second interval. Thus, the horizontal axis of each graph has a range of one second. FIGS. 10A and 10B represent an intact state and a broken state respectively of a watering zone. A profile parameter can be the area under the average curve for FIG. 10A. A operation parameter can be the area under the average curve for FIG. 10B. The latter is much larger than the former, and the malfunction can be clearly identified. FIGS. 10C and 10D represent an intact state and a broken state for the same watering zone but measured again (see dashed connectors in FIGS. 5 and 6). While the resulting signals are not exactly the same, they still show a large difference in signal between the broken versus the unbroken state of the zone.

Figure 11:
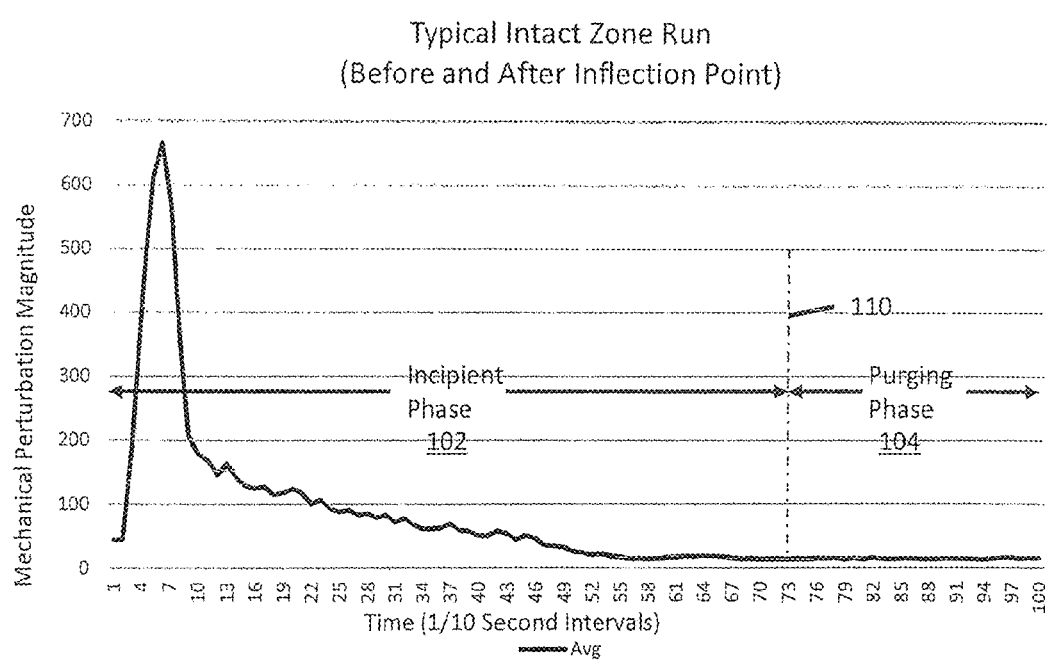
FIG. 11 is a plot of mechanical perturbation magnitude versus time for an intact watering system. Each point on the graph is an averaged value for a 0.1 second interval. The numbers on the horizontal axis represent tenths of a second and the total elapsed time is about 10 seconds. The vertical axis is dimensionless and has a magnitude that is proportional to a magnitude of an amplitude of oscillation.

FIG. 11 is a plot of mechanical perturbation versus time for an intact watering system. Each point on the graph is an averaged value for a 0.1 second interval. The numbers on the horizontal axis represent tenths of a second and the total elapsed time is about 10 seconds. Illustrated in this graph is an "inflection point" 110 at about 7.3 seconds. The inflection point 110 is a dividing point between the incipient phase 102 and the air purging phase 104. The inflection point 110 is defined as a point of minimum perturbation magnitude after the peak perturbation magnitude of during the incipient phase.

Figure 12A:
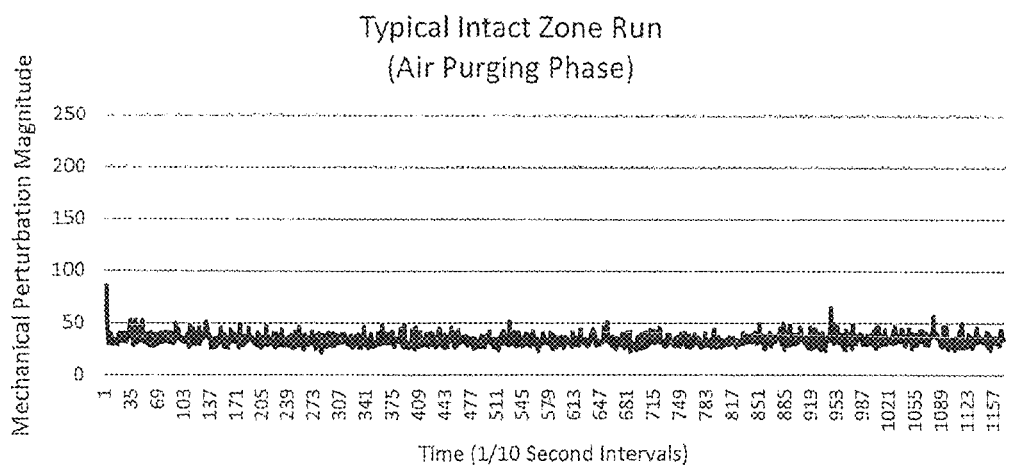
FIG. 12A is a plot of mechanical perturbation magnitude versus time starting at an "inflection point" for an intact watering system zone. Each point on the graph is an averaged value for a 0.1 second interval. The numbers on the horizontal axis represent tenths of a second and the total elapsed time is about 130 seconds.
Figure 12B:
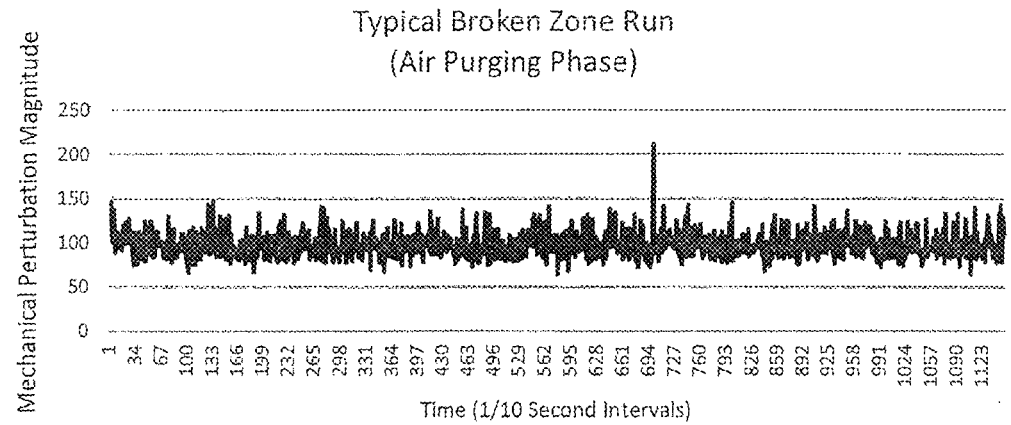
FIG. 12B is a plot of mechanical perturbation magnitude versus time starting at an "inflection point" for a broken watering system. Each point on the graph is an averaged value for a 0.1 second interval. The numbers on the horizontal axis represent tenths of a second and the total elapsed time is about 130 seconds.

FIG. 12A is a plot of mechanical perturbation versus time starting at an "inflection point" for an intact zone. Each point on the graph is an averaged value for a 0.1 second interval. The numbers on the horizontal axis represent tenths of a second and the total elapsed time is about 130 seconds. FIG. 12B is the same as FIG. 12A except for a broken zone.

Method Three—Average Oscillation Magnitude at the Inflection Point and/or during the Air Purging Phase: FIGS. 12A and 12B depict intact and broken zones respectively. The broken zone has a larger magnitude of oscillation due to a higher flow rate. The magnitude of the oscillations for some portion of the air purging phase can be used to define a profile parameter for the calibration profile 74 (step 72 of FIG. 5). This magnitude can be computed by taking an area under the oscillation curve. The same type of parameter can be computed during a watering operation (FIG. 6). The operation parameter can be compared to the profile parameter in step 94. If the operation parameter is sufficiently larger than the profile parameter, then a malfunction would be indicated in step 96.

Figure 13A:
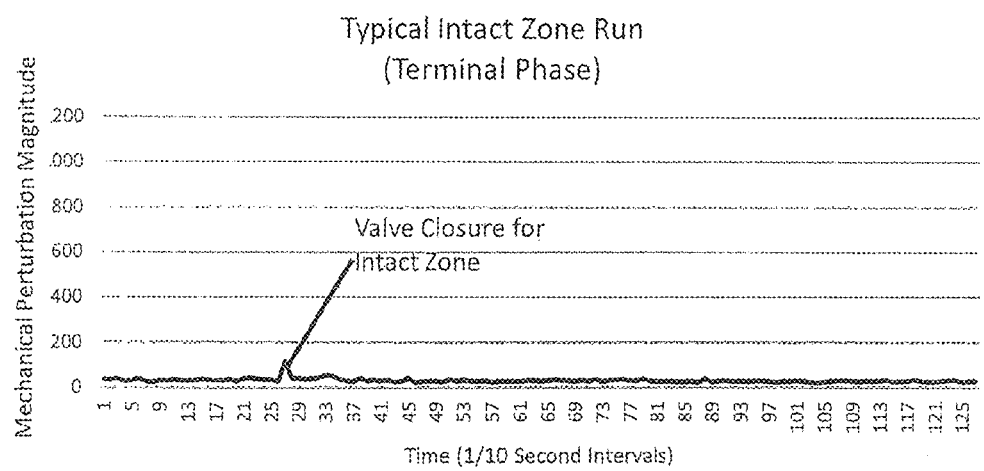
FIG. 13A is a plot of mechanical perturbation magnitude versus time for an intact system. The largest spike on this plot represents valve closure. Each point on the graph is an averaged value for a 0.1 second interval. The numbers on the horizontal axis represent tenths of a second and the total elapsed time is about 130 seconds.
Figure 13B:
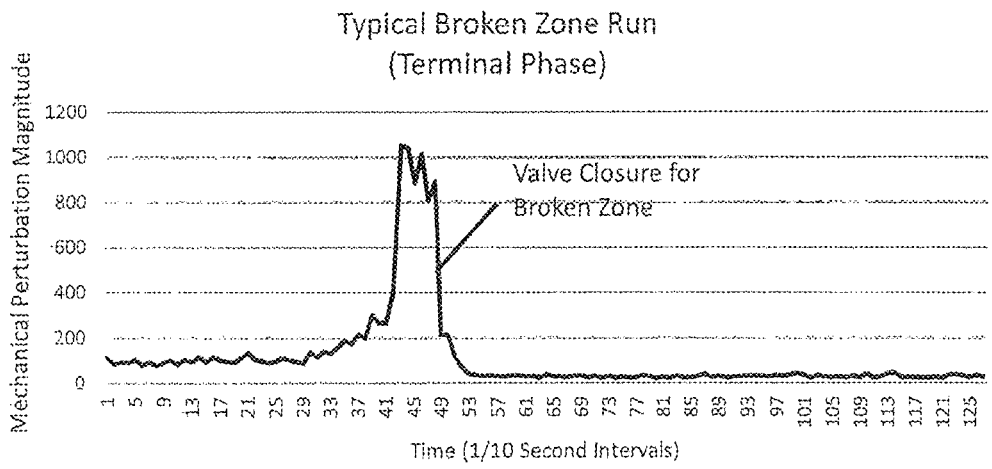
FIG. 13B is a plot of mechanical perturbation magnitude versus time for a broken system. The largest spike on this plot represents valve closure. Each point on the graph is an averaged value for a 0.1 second interval. The numbers on the horizontal axis represent tenths of a second and the total elapsed time is about 130 seconds.

FIG. 13A is a plot of mechanical perturbation versus time for an intact zone. The largest spike on this plot represents valve closure. Each point on the graph is an averaged value for a 0.1 second interval. The numbers on the horizontal axis represent tenths of a second and the total elapsed time is about 130 seconds. FIG. 13B is the same as FIG. 13A except for a broken zone.

Method Four—Oscillatory Shock during Terminal Phase: This method is illustrated in FIGS. 13A and 13B for an intact and broken zone respectively. For the intact zone (13A), there is a small perturbation due to the valve closure and then the oscillations gradually decrease. For the broken zone (13B), closure of the valve causes an immediate large pressure change between the conduit upstream and the conduit downstream of the valve. This results in a large perturbation that can be clearly distinguished from the intact zone.

The profile 74 can include a profile parameter that is indicative of the smaller perturbation for an intact system during the terminal phase. One such parameter can quantify the area under the perturbation curve. During a watering operation 80 (FIG. 6), the operation parameter is computed and compared with the profile parameter. If the comparison indicates a difference above a certain threshold, then a malfunction is indicated as in steps 66 and 100 of FIG. 6.

The specific embodiments and applications thereof described above are for illustrative purposes only and do not preclude modifications and variations encompassed by the scope of the following claims.

What is claimed:

1. An automated system for identifying a malfunction of a zone, the zone comprising a valve connected to a conduit delivering water to one or more water distributors, the automated system comprising:
 a sensor configured to output a plurality of signals based upon mechanical perturbations of the zone, the mechanical perturbations comprising a plurality of oscillations of the conduit delivering the water to the one or more water distributors; and
 a controller configured to:
  store a profile defining at least one profile parameter based upon a transient operation of the zone in an intact state;
  receive at least a portion of the plurality of signals from the sensor during a watering operation when the zone is in an unknown state;
  compute an operation parameter based upon the at least portion of the plurality of signals for at least one time window of the receipt of the at least portion of the plurality of signals, the at least one time window comprising a time window for an incipient phase characterized by a measurement of a peak magnitude associated with the plurality of oscillations during an opening of the valve and initial flow of the water through the conduit immediately after the valve is opened;
  compare the operation parameter to the at least one profile parameter; and
  determine whether to perform one or more actions based upon the comparison.

2. The automated system of claim 1 wherein the sensor comprises an accelerometer.

3. The automated system of claim 1 wherein the at least one time window further comprises at least one of (i) a time window for an air purging phase characterized by a detection of at least a portion of the plurality of oscillations from exhaustion of air from the conduit, and (ii) a time window for a terminal phase characterized by a detection of at least a portion of the plurality of oscillations from a closing of the valve and as flow of the water through the conduit ceases.

4. The automated system of claim 3 wherein the at least one profile parameter comprises a plurality of different profile parameters each corresponding to the respective time windows for the incipient phase, the air purging phase, and the terminal phase during measurements of the zone in the intact state.

5. The automated system of claim 4 wherein the controller is configured to perform separate comparisons for each of the different profile parameters to detect a system malfunction.

6. The automated system of claim 1 wherein the at least one profile parameter comprises a parameter that correlates with an average amplitude of the plurality of oscillations during the time window for the incipient phase.

7. The automated system of claim 6 wherein the incipient phase is completely defined within 10 seconds after the opening of the valve.

8. The automated system of claim 1 wherein the at least one time window comprises a time window for an air purging phase that begins after the incipient phase, the at least one profile parameter comprises a parameter that correlates with an average amplitude of a portion of the plurality of oscillations during the air purging phase.

9. The automated system of claim 8 wherein the time window for the air purging phase begins more than one second after the valve is actuated.

10. The automated system of claim 1 wherein the at least one time window comprises a time window for a terminal phase that includes time during a closing of the valve, and wherein the identifying of the malfunction of the zone comprises an identification of an increase in magnitude of a transient perturbation peak that occurs in response to the closing of the valve.

11. The automated system of claim 1 wherein the one or more actions comprise at least one of (i) sending an alert to a client device or (ii) suspending operation of the valve until corrective action can be taken.

12. A method of identifying a malfunction of a zone, the zone comprising a valve connected to a conduit delivering fluid to one or more distributors, the method comprising:
 storing a profile defining at least one profile parameter based upon a transient operation of the zone in an intact state during a calibration operation;
 sensing mechanical perturbations of the zone during an operation when the zone is in an unknown state;
 computing at least one operation parameter based upon the sensed mechanical perturbations for at least one time window, the at least one time window comprising at least one time window for a terminal phase of the operation, the terminal phase commencing by a closing of the valve and characterized by a detection of one or more residual vibrations as flow of the fluid through the conduit ceases;
 comparing the at least one operation parameter to the at least one profile parameter; and
 determining whether to perform one or more actions based upon the comparing.

13. The method of claim 12 wherein the at least one profile parameter has a magnitude that correlates with an area under a curve of perturbation magnitude versus time during the calibration operation, the at least one operation parameter has a magnitude that correlates with an area under a curve of perturbation magnitude versus time during the operation, the determination to perform one or more actions is based upon a difference between the at least one operation parameter and the at least one profile parameter exceeding a threshold.

14. A system for identifying a malfunction of a zone, the zone comprising a valve connected to a conduit delivering water to one or more water distributors, the system comprising:
 one or more sensors, each of the one or more sensors configured to output a plurality of signals based upon mechanical perturbations of the zone, wherein the one or more sensors are at least one of (i) disposed located on or proximate to the valve, or (ii) integrated within the valve; and a controller configured to:
  (i) perform a calibration operation during an intact state, the performance of the calibration operation comprising:
    operation of the valve to allow fluid flow to occur for a time duration during the calibration operation;
    receipt of the at least a first portion of the plurality of signals during one or more transient phases of the zone during the calibration operation;
    analysis of the at least first portion of the plurality of signals from the calibration operation to generate a profile parameter; and
    storage of the profile parameter;
  (ii) perform a watering operation during an unknown state, the performance of the watering operation comprising:
    operation of the valve to allow fluid flow to occur during a time duration during the watering operation;
    receipt of the at least a second portion of the plurality of signals during one or more transient phases of the zone during the watering operation;
    analysis of the at least second portion of the plurality of signals from the watering operation to generate at least one operation parameter;
    a comparison of at least the at least one operation parameter to the profile parameter; and
    a determination of a malfunction based upon the comparison.

15. The system of claim 14 wherein at least one of (i) the analysis of the at least first portion of the plurality of signals, or (ii) the analysis of the at least second portion of the plurality of signals, is based on at least one time window that includes at least a portion of one of the one or more transient phases.

16. The system of claim 15 wherein the at least one time window comprises a plurality of different time windows, and the profile parameter comprises a plurality of different profile parameters each computed from one of the plurality of different time windows.

17. The system of claim 15 wherein the profile parameter has a magnitude that correlates with an area under a curve of perturbation amplitude versus time during the calibration operation, the at least one operation parameter has a magnitude that correlates with the area under a curve of perturbation amplitude versus time during the watering operation, and the determination of the malfunction is based upon a difference between the at least one operation parameter and the profile parameter exceeding a threshold.

18. The automated system of claim 1 wherein the sensor comprises a microphone.

19. The method of claim 12, wherein the closing of the valve is caused by a lack of back pressure and the detection of the one or more residual vibrations comprises detection of the one or more residual vibrations associated with the closing of the valve caused by the lack of back pressure.

20. The system of claim 14, wherein:
  the generation of the at least one operation parameter comprises generation of a first operation parameter;
  the performance of the watering operation further comprises:
    (i) a second operation of the valve to allow fluid flow to occur during the time duration;
    (ii) receipt of at least a third portion of the plurality of signals; and
    (iii) analysis of the at least third portion of the plurality of signals from the watering operation to generate a second operation parameter; and
  the comparison of at least the at least one operation parameter to the profile parameter comprises a comparison of at least the first and second operation parameters to the profile parameter.

* * * * *